United States Patent [19]
Cirigliano et al.

[11] Patent Number: 6,146,675
[45] Date of Patent: *Nov. 14, 2000

[54] FOODSTUFF PRESERVATION

[75] Inventors: Michael Charles Cirigliano, Cresskill, N.J.; Michele Alice Buchanan, Montgomery, N.Y.

[73] Assignee: Lipton, division of Conopco, Inc., Englewood Cliffs, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/183,370

[22] Filed: Oct. 30, 1998

[51] Int. Cl.⁷ .................. A21D 4/00; A23L 3/36; A23L 3/34
[52] U.S. Cl. ............. 426/330.6; 426/335; 426/519; 426/532; 426/603; 426/605; 426/654; 514/31
[58] Field of Search ................... 426/532, 330, 426/330.6, 331, 332, 335, 541, 654, 605, 603, 519; 514/31

[56] References Cited

U.S. PATENT DOCUMENTS

| 4,132,777 | 1/1979 | Van Os et al. ............ 424/119 |
| 4,536,494 | 8/1985 | Carter ..................... 514/31 |
| 4,600,706 | 7/1986 | Carter ..................... 514/31 |
| 5,552,151 | 9/1996 | Noordam et al. ........... 424/439 |
| 5,573,801 | 11/1996 | Wilhoit ................... 426/326 |
| 5,597,598 | 1/1997 | Van Rijn et al. .......... 426/310 |
| 5,738,888 | 4/1998 | Cirigliano et al. .......... 426/52 |
| 5,821,233 | 10/1998 | Van Rijn et al. ........... 514/31 |

FOREIGN PATENT DOCUMENTS

WO 9848649  4/1998  WIPO .

Primary Examiner—Nina Bhat
Attorney, Agent, or Firm—James J. Ferrell

[57] ABSTRACT

A natural microbiocidal and/or microbiostatic composition wherein the sole antibiotic antimicrobiocidal agent is Natamycin which inhibits or destroys yeast and mold in selected foodstuffs.

20 Claims, No Drawings

FOODSTUFF PRESERVATION

BACKGROUND OF THE INVENTION

Field of the Invention

The present invention relates to the use of a natural preservative, Natamycin, in foodstuffs such as dressings, sauces, marinades, condiments, spreads, margarine, dairy based foods and the like. The foodstuffs under some conditions are subject to microbial spoilage.

"Food preservation", as that term is used herein, includes methods which guard against food poisoning as well as methods which delay or prevent food spoilage due to microbes. Food preservation keeps food safe for consumption and inhibits or prevents nutrient deterioration or organoleptic changes causing food to become less palatable.

"Food spoilage", as that term is used herein, includes any alteration in the condition of food which makes it less palatable including changes in taste, smell, texture or appearance. Spoiled food may or may not be unsafe.

Prevention of food spoilage has been attempted throughout history often through trial and error. The early attempts have resulted in the adoption of such food preservation methods as the drying, salting and/or smoking of foods in order to preserve them. It has been relatively recent in recorded history that food preservation has been placed upon a scientific foundation.

Present food technologists utilize an array of physical, chemical and biological processes and agents to preserve food and prevent the transmission of disease via foodstuffs. Many chemical agents exist. These agents include antioxidants to prevent chemical degradation of food, as well as compositions which kill or inhibit deleterious bacteria and/or other microbes thereby preserving food, i.e., preventing both spoilage and the transmission of disease.

Of rising concern in the food process industry is yeast and mold spoilage of various foods such as cheese, dairy products including novelty ice cream, dressings, spreads, margarine and seafood. Of particular concern is evidence that pasteurized and fully cooked processed foods are being contaminated with microbes following cooking or pasteurization and prior to packaging for point of sale.

Food preservation by inhibition of growth of yeasts and molds is often difficult. Unfortunately, microorganism contamination may occur following pasteurization by the processor. Acidified and native pH salad dressings, sauces, marinades, spreads, margarines and other dairy based foods and beverages in the 2.0 to 7.0 pH range are known to be susceptible to spoilage by yeast and mold.

Many people eat processed foods after a significant period of time has elapsed from a first cooking or pasteurization by the food manufacturer thereby permitting bacteria introduced by post-pasteurization contamination to grow. Since this food consumption may occur without reheating the processed food to sufficient temperatures for sufficient time to kill any microbes which may have been introduced subsequent to initial cooking, there is a risk of food spoilage. The present invention seeks to ameliorate the aforementioned risk.

Related Art

Natamycin, also known as pimaricin, is an antifungal agent produced by *Streptomyces natalensis*. This compound is effective against yeasts and molds and is reported to be ineffective against bacteria. It is approved for use as an additive which may be applied to the surface of cuts and slices of cheese to inhibit mold spoilage (21 C.F.R. 172.155). This information is available from an article on "Antimicrobials: Assuring Food Safety" by J. Giese in the June 1994 Food Technology periodical 48 (6) pp. 101–110.

Natamycin has been used in animal feeds, U.S. Pat. No. 4,600,706, in sausage casings, U.S. Pat. No. 4,664,861, and in mixtures with other preservatives to preserve milk, U.S. Pat. No. 5,196,344.

Generally, however, the solubility of Natamycin has limited its use to the surface treatment of cheese for which it is approved by the FDA.

Natamycin has also been of interest in the treatment of food products because it is highly active against yeast and molds, as opposed to bacteria (see Morris and Hart, "Pimaricin—What Is It?", Culture Dairy Products Journal, Volume 13, page 22, 1987). Reportedly, Natamycin has been applied to food products in several ways. It has been added in dry form to liquids, slurries, pastes and semisolids when adequate mixing can be accomplished, or the pure Natamycin can be mixed with one or more of the dry ingredients and then added to a given food product. Solid foods requiring surface protection can be dipped, misted, fogged or dusted with a solution or suspension of Natamycin. Additionally, it has been suggested that protection from yeast and mold may be achieved in solid food by incorporating Natamycin homogeneously into the food itself.

Natamycin has also been used to retard spoilage of dressed poultry, to protect cottage cheese, and has been widely used in the dip-treatment of cheeses to coat them with the fungicide which is absorbed slightly, and dries to form a solid, surface coating. Various other reports suggest that Natamycin is effective in the treatment of fresh berries, tomatoes, strawberries and raspberries. These reports indicate that Natamycin has an anti-yeast activity when added to wines, and various fruit juices, such as apple juice or orange juice. (See Morris and Hart, cited above.)

SUMMARY OF INVENTION

It is an object of this invention to provide a novel natural microbiocidal and/or microbiostatic composition for preserving selected foodstuffs.

A further object is to provide a method for preserving foodstuffs by employing a novel natural microbiocidal and/or microbiostatic component in the foodstuff.

The above object may be achieved by incorporating Natamycin into selected foodstuffs.

It has been found that Natamycin, when introduced into foodstuffs alone in its commercial form (as "Delvocid®"—50/50 blend with lactose or sodium chloride) at concentrations ranging from 20–1000 ppm (10–500 ppm as natamycin), to be extremely effective against yeast and mold, completely inhibiting or significantly delaying their outgrowth, but showing little if any effect against bacteria. However, some foodstuffs do not require stringent methods to kill bacteria. The stability and ostensibly the efficacy of Natamycin, reported to be sensitive to oxidation, appears to be enhanced by the presence of antioxidants and/or oxygen scavengers (such as ascorbic acid) and the like. Further, heavy metals and divalent cations, are also reported to adversely affect the stability of Natamycin. A preferred embodiment capitalizes on the incorporation of citric acid and/or water softening to negate this effect and sustain the efficacy of the "all-natural" system. The use of chemical chelating agents like EDTA, SHMP (sodium hexametaphosphate) and phosphoric acid may also be used to sustain system efficacy over time where water hardness control is not absolute.

BRIEF DESCRIPTION OF THE INVENTION

Many preservatives are readily available for many diverse uses. Many foodstuffs are relatively easy to stabilize. Other foodstuffs, however, because of their delicate balance of flavors require the utmost care in selecting preservatives. A fine balance must thus be achieved in stabilizing the foodstuff without deleteriously affecting its flavor.

The method of the invention employs a preservative system including Natamycin (pimaricin) to preserve a foodstuff such as sauces, dressings, marinades, dairy products, spreads, margarines and the like.

A novel antimicrobial composition comprising Natamycin is expected to have particularly good antimicrobial properties. Additionally, the inventive composition surprisingly is expected to be able to prolong food shelf life by preventing food spoilage for a long period of time. Natamycin is used in the 10–500 ppm range to effect stability. The amount of Natamycin employed will depend on the amount of water in the foodstuff to be preserved. In a margarine containing only about 20% water, 10 ppm Natamycin may be as effective as 50 ppm Natamycin in a dressing containing 85 to 90% water. The amount of preservative used is directly proportional to the amount of water available in the food. Thus, about 10 to 500 ppm Natamycin or more may be used and preferably about 50 to 500 ppm or more based on the water content.

The preservation technology can be used to effect microbiological stability and/or safety in beverages, such as fruit and vegetable juices, herbal tea beverages, soft drinks, or any other beverage distributed at ambient (or chilled temperatures) and requiring chemical preservations, a thermal process, strict chill chain control, or other technology to prevent yeast and/or mold spoilage as well as the other foodstuff systems mentioned. The incorporation of the Natamycin preservative system could achieve this while permitting an "all natural" claim, according to the current labeling convention for these agents.

The system is believed to be enhanced by the incorporation of an oxygen scavenger or antioxidant, and/or a chelating agent or through water hardness control, to sustain Natamycin activity by preventing its degradation. Several of the preferred embodiments of the foodstuffs also include ascorbic acid, a known oxygen scavenger, which also contributes to this effect.

Heavy and divalent metals are also reported to adversely affect the stability of Natamycin. One preferred embodiment incorporates citric acid, a natural sequestrant. This is further enhanced by the incorporation of other sequestering agents and/or by water hardness control which removes heavy metals as well as divalent metals. This negates the effect and sustains the efficacy of the Natamycin in an "all-natural" system. Other sequestering agents such as EDTA and it organic and inorganic salts, e.g., sodium and the like, metaphosphoric acid salts, polyphosphoric acid salts, tartaric acid salts, and phosphoric acid may also be used to sustain system efficacy over time, where water hardness control is not absolute.

Further, the simple expedient of incorporating a concentration of Natamycin, 1.5 times or more in excess of its maximum solubility also is expected to significantly enhance its effect, ostensibly by providing a "preservative" reserve buffer.

Natamycin, a fermentation by-product that is a naturally derived antimicrobial thus affords an opportunity to stabilize certain foodstuffs naturally without the use of chemical preservatives.

Natamycin is a creamy white, odorless, tasteless, practically insoluble crystalline amphoteric powder. It belongs to the polyene macrolide or macrocylic lactone group of compounds. In low concentrations, Natamycin is a potent inhibitor of fungal microorganisms.

Natamycin is relatively stable when in a dry state or when mixed with dry diluents. However, the molecules activity is sensitive to ultraviolet light, oxygen or extreme pH values. It is relatively insoluble in water in which its solubility is of the order 0.005–0.010 weight/weight percent. Additionally, even in solution, Natamycin is rather unstable. Aqueous solutions of 16 mcg/ml of Natamycin became microbiologically inactive after 24 hours exposure to light. Inactivation of Natamycin by light, peroxides or oxygen proceeds at the fastest rate in solution or suspension. Natamycin is also sensitive to heavy metals, and it may lose up to 75% of its effectiveness in 4–5 hours in their presence.

Natamycin is also referred to by other names, e.g., Pimaricin, antibiotic A 5283, tennecetin, CL 12625, Mycrophyt, Myprozine, Natacyn and Pimafucin. Naturally, the present invention extends to compositions employing Natamycin under any of its alternative names or designations. The antibiotic is currently available from a number of companies under various trademarks, e.g., from Gist-Brocades Food Ingredients, Inc., of King of Prussia, Pa. under the trademark Delvocid®. Further details of the antibiotic can be found in the Merck Index, Tenth Edition, 1983, published by Merck & Co., Inc., entry no. 6278, page 922.

The addition of about 10 to 500 ppm of Natamycin to foodstuffs is expected to reduce or completely eliminate mold and yeast outgrowth in the foodstuff in the time frame required for commercial sale. This time frame varies considerably with the type of food, the distribution and sale conditions (e.g., chilled vs. ambient) and the like.

The advantage of using Natamycin is that it allows the reduction or elimination of chemical preservatives thereby making a microbiologically stable product which is also typically more organoleptically acceptable than those containing higher levels of chemical preservatives.

Examples of spreads that are expected to be improved by the addition of Natamycin are those taught by U.S. Pat. Nos. 4,956,193; 5,451,422; 5,064,677; 4,917,915 and 5,302,408. Other spreads are also expected to benefit.

All parts and proportions herein and in the appended claims are by weight unless otherwise indicated.

An Italian salad dressing formulation is prepared as follows:

|  | Components | % |
|---|---|---|
| Part 1 | Water | 70.0 |
|  | Vinegar | 7.0 |
|  | Sodium Chloride | 2.0 |
|  | Sweetener | 4.0 |
|  | Gum | 0.4 |
|  | Flavors | 0.9 |
| Part 2 | Vegetable Oil | 5.3 |
|  | Natamycin | varies |
|  | Nisin | varies |
| Part 3 | Water | 4.3 |
|  | Vinegar | 4.27 |
|  | Gum | 0.03 |
|  | Spices and Flavors | 1.80 |

Parts 1 and 2 are mixed and homogenized. Part 3 is then added and thoroughly mixed to form a homogenous mixture.

EXAMPLE 1

400 ppm of Delvocid® is added to the dressing formula as above (200 ppm Natamycin). Samples of the dressing are then inoculated with yeast organisms. The effect of Natamycin is observed over a period of time. The Natamycin is expected to prevent outgrowth of mold and yeast.

EXAMPLE 2

A dressing is prepared from the following components:

|  |  | % by wt. |
|---|---|---|
| aqueous phase | ground tomato | 25.9 |
|  | cider vinegar | 20.8 |
|  | water | 44.2 |
|  | sundried tomatoes | 2.1 |
|  | sodium chloride | 1.8 |
|  | dehydrated minced garlic | 1.1 |
|  | frozen oregano | .4 |
|  | basil | .5 |
|  | xanthan gum | .2 |
|  | white onion powder | 2.5 |
|  | sucrose | .7 |
| oil phase | soybean oil | 53.4 |
|  | olive oil | 46.6 |

The phases are mixed and varying amounts of Natamycin are added. The Natamycin is expected to be effective to prevent mold spoilage.

EXAMPLE 3

A spread formulation is prepared as follows with the components of Table 1.

TABLE 1

| Ingredients | % wt. in Product |
|---|---|
| oil phase | 40 |
| Lecithin | 0.2 |
| saturated distilled monoglycerides iodine value = <5 | 0.25 |
| flavor (artificial butter) | 0.008 |
| beta carotene and vitamin A | 0.007 |
| fat blend - partially hydrogenated bean oil and liquid oil | 39.5 |
| aqueous phase | 59.958 |
| maltodextrin - Paselli Excel | 3.500 |
| alginate - Manucol VDU | 0.700 |
| gelatin pork - 250 bloom | 2.500 |
| spray dried butter milk | 0.250 |
| EDTA, calcium sodium | 0.006 |
| lactic acid (88%) | 0.070 |
| salt | 1.500 |
| water | 51.432 |

Lactic acid together with 200 ppm Natamycin is added to obtain a pH of 5.0 and the oil is added to the mixture which is still maintained at 60° C. The composition is then passed through a scraped surface heat exchanger to pasteurize. The composition is pasteurized at 85° C. for 15 seconds. The pasteurized composition is then passed through a scraped surface heat exchanger and cooled to 7–20° C. The composition is inverted to a fat continuous emulsion using a high speed crystallizer and further cooled to a temperature of 7–18° C. by passing through a scraped surface heat exchanger. The composition is packed into stick form and stored at 5° C.

The composition is expected to be mold and yeast free after six months storage at refrigerated temperatures.

EXAMPLE 4

| Base Spread Formulation A | |
|---|---|
| Oil (partially hydrogenated + liquid oil mix) | 24% |
| Gelatin | 3% |
| Rice Starch | 1% |
| Salt | 1% |
| Water | 70.1% |
| Lactic Acid | sufficient to adjust to pH 4.9 |

| Base Spread Formulation B | |
|---|---|
| Oil (partially hydrogenated + liquid oil mix) | 26% |
| Gelatin | 3% |
| Rice Starch | 1% |
| Salt | 1% |
| Water | 68.1% |
| Lactic Acid | sufficient to adjust to pH 4.9 |

The above two formulae are treated with 0, 5, 10, and 15 ppm natamycin (using 0, 10, 20 and 30 ppm "Delvocid", i.e. Gist-brocades 50/50, natamycin/sodium chloride blend) and are "surface" challenged with 9 strains of "spoilage" mold. The natamycin at 10 ppm is expected to be effective.

Although the invention has been described in detail with respect to preferred embodiments thereof, variations and modifications will be readily apparent to those skilled in the art without departing from the spirit and scope of the inventions as set forth in the claims.

What is claimed is:

1. A foodstuff containing homogeneously incorporated therein as the sole antibiotic antimicrobial agent a sufficient amount of Natamycin to prevent microbial spoilage, said foodstuff having a pH of about 2.0 to 7.0.

2. A foodstuff as defined in claim 1 wherein said food material is selected from the group consisting of dressings, sauces, marinades, dairy foods, spreads and margarine.

3. A foodstuff as defined in claim 1 wherein said Natamycin is present in an amount of at least 10 to 500 ppm based on the water content of the foodstuff.

4. A foodstuff as defined in claim 1 having sufficient Natamycin to completely inhibit outgrowth of yeast or mold.

5. A foodstuff as defined in claim 1 containing a sufficient amount of Natamycin to destroy and/or inhibit growth of yeast or mold.

6. A foodstuff as defined in claim 1 further comprising an antioxidant and or oxygen scavenger.

7. A foodstuff as defined in claim 1 wherein the Natamycin is present in an amount of 1.5 times the maximum solubility of said Natamycin in the foodstuff.

8. A foodstuff as defined in claim 1 wherein a sequestrant is present in an amount sufficient to reduce the effect of solubilized metals on the Natamycin.

9. A foodstuff as defined in claim 1 wherein the water used to prepare the foodstuff is treated to reduce the water hardness to a level of 120 ppm or less measured as calcium carbonate.

10. A foodstuff as defined in claim 1 comprising a dressing have 0% to about 60% fat and having a pH of about 2.5 to 4.5.

11. A foodstuff as defined in claim 1 comprising a spread having from 0% to about 80% fat.

12. A method of improving the microbial stability of foodstuffs to prevent microbial growth, in the foodstuff for a period of at least about 6 to 16 weeks which comprises homogeneously admixing about 10 to about 500 ppm of Natamycin based on the water content of the foodstuff into the foodstuff said Natamycin being the sole antibiotic antimicrobial agent in said foodstuff.

13. A method as defined in claim 12 wherein said foodstuff has a pH of about 2.0 to 7.0.

14. A method as defined in claim 12 wherein said foodstuff is selected from the group consisting of dressings, sauces, marinades, dairy foods, spreads and margarine.

15. A method as defined in claim 12 wherein said foodstuff has sufficient Natamycin to completely inhibit outgrowth of yeast or mold.

16. A method as defined in claim 12 further comprising homogeneously admixing in said foodstuff an antioxidant or oxygen scavenger.

17. A method as defined in claim 12 wherein the Natamycin is present in an amount of 1.5 times the maximum solubility of said Natamycin in the foodstuff.

18. A method as defined in claim 12 wherein a sequestrant is homogeneously admixed with said foodstuff in an amount sufficient to reduce the effect of solubilized metals on the Natamycin.

19. A method as defined in claim 12 wherein the water used to prepare the foodstuff is treated to reduce the water hardness to a level of 120 ppm or less measured as calcium carbonate.

20. A method of destroying and/or inhibiting the outgrowth of mold or yeast in a foodstuff comprising homogeneously admixing about 10 to about 500 ppm based on the water content of the foodstuff of Natamycin into the foodstuff said Natamycin being the sole antibiotic antimicrobial agent in the foodstuff.

* * * * *